Fig. 1.

INVENTOR.
THOMAS EDISON WESTALL
BY Kenyon & Kenyon
ATTORNEYS

INVENTOR.
THOMAS EDISON WESTALL
BY
ATTORNEYS

April 25, 1967     T. E. WESTALL     3,315,499
APPARATUS FOR CONTROLLING A DYEING MACHINE
Original Filed Jan. 7, 1963     10 Sheets-Sheet 3

INVENTOR.
THOMAS EDISON WESTALL
BY
ATTORNEYS

INVENTOR.
THOMAS EDISON WESTALL
BY
ATTORNEYS

April 25, 1967 T. E. WESTALL 3,315,499
APPARATUS FOR CONTROLLING A DYEING MACHINE
Original Filed Jan. 7, 1963 10 Sheets-Sheet 5

INVENTOR.
THOMAS EDISON WESTALL
BY
Kenyon & Kenyon
ATTORNEYS

April 25, 1967     T. E. WESTALL     3,315,499

APPARATUS FOR CONTROLLING A DYEING MACHINE

Original Filed Jan. 7, 1963     10 Sheets-Sheet 10

Fig. 9.

INVENTOR.
THOMAS EDISON WESTALL
BY
ATTORNEYS

United States Patent Office 3,315,499
Patented Apr. 25, 1967

3,315,499
APPARATUS FOR CONTROLLING A
DYEING MACHINE
Thomas E. Westall, Marion, N.C., assignor to The American Thread Company, New York, N.Y., a corporation of New Jersey
Continuation of application Ser. No. 249,719, Jan. 7, 1963. This application June 13, 1966, Ser. No. 557,321
10 Claims. (Cl. 68—12)

This is a continuation of application Ser. No. 249,719, filed Jan. 7, 1963.

This invention relates to apparatus for dyeing yarn and the like and more particularly to means for controlling the cycle of operation of the dyeing apparatus.

In the yarn industry it is necessary to produce many hundreds of different shades of yarn in order to satisfy the requirements of textile manufacturers, the garment industry, etc. Each of the many hundreds of shades require a particular variety of chemicals, dyes and the like and a particular cycle for applying them to the yarn. Thus for producing each shade, the dyeing process may include variations in the time duration of each treatment, in the types of chemicals, in the quantities of chemicals and in temperature.

For both the purpose of standardization and for economic reasons it is always desirable that the color of a particular shade of yarn be maintained within close tolerances for subsequent batches of the yarn. This can only be achieved by processing each batch in practically the exact same conditions as employed for previous batches.

Typical dyeing formulas required for various shades of yarn involve a great number of operating steps and can require a duty cycle of as much as six hours. It has been common practice in industry to use one human operator to monitor and control several dye machines. Because of the great number of steps involved in dyeing in accordance with each formula and since the operator tends several machines, it is inevitable that human error is introduced which causes a deviation of the yarn from the desired shade. When a deviation in shade occurs with manual control of the process, it is oftentimes impossible to determine the cause of the deviation. Thus, it is left in doubt whether the chemicals and dyes or failure of the operator to observe the operating steps necessary for the formula are at fault. In any event a deviation from the desired shade generally requires redyeing which inherently increases the cost of the product and in many cases the redyed product is of lower quality.

It is an object of the invention to provide an automatically controlled dye machine.

It is an additional object of the invention to provide a control system which is capable of programming the complete cycle of operation of a dye machine regardless of the shade which is to be produced.

It is another object of the invention to provide a control apparatus for programming a dye machine which can be quickly converted from one program for a given dye to another.

It is still another object of the invention to provide a system for automatically programing a dye machine but which at the same time can be interrupted for manual operation.

In one embodiment of the invention a master controller provides a timed program to operate the dye machine through all of the operations of a dyeing process.

In another embodiment of the invention a master controller is provided which includes a plurality of channels each being adapted to control one or more elements of the dye machine in accordance with a timed program.

In an additional embodiment of the invention the master controller includes a plurality of cams each of which controls one or more elements of the dye machine.

In a further embodiment of the invention the master controller is adapted to receive one of a plurality of drums, each of said plurality of drums having a multiplicity of cams corresponding to a particular dyeing process and each drum being adapted to program the dye machine through a different predetermined dyeing process.

In still a further embodiment of the invention the master controller for the dye machine is adapted to be interrupted in order to introduce manual control at the discretion of the human operator.

Other objects and features of the invention will become apparent in the following description and claims and in the drawings in which:

FIG. 3 is a plan view of the master controller showing the cam drum therein;

FIG. 8F is a schematic representation of the circuitry controlled by cam 6;

FIG. 8G is a schematic representation of the circuitry controlled by cam 7;

FIG. 8H is a schematic representation of the circuitry controlled by cam 8;

FIG. 8J is a schematic representation of the circuitry controlled by cam 9;

FIG. 8K is a schematic representation of the circuitry controlled by cam 10;

FIG. 8L is a schematic representation of the circuitry controlled by cam 11;

FIG. 8M is a schematic representation of the circuitry controlled by cam 12;

FIG. 8N is a schematic representation of the circuitry controlled by cam 13;

FIG. 8P is a schematic representation of the circuitry controlled by cam 16;

FIG. 8Q is a schematic representation of the circuitry controlled by cam 17;

Figure 1:
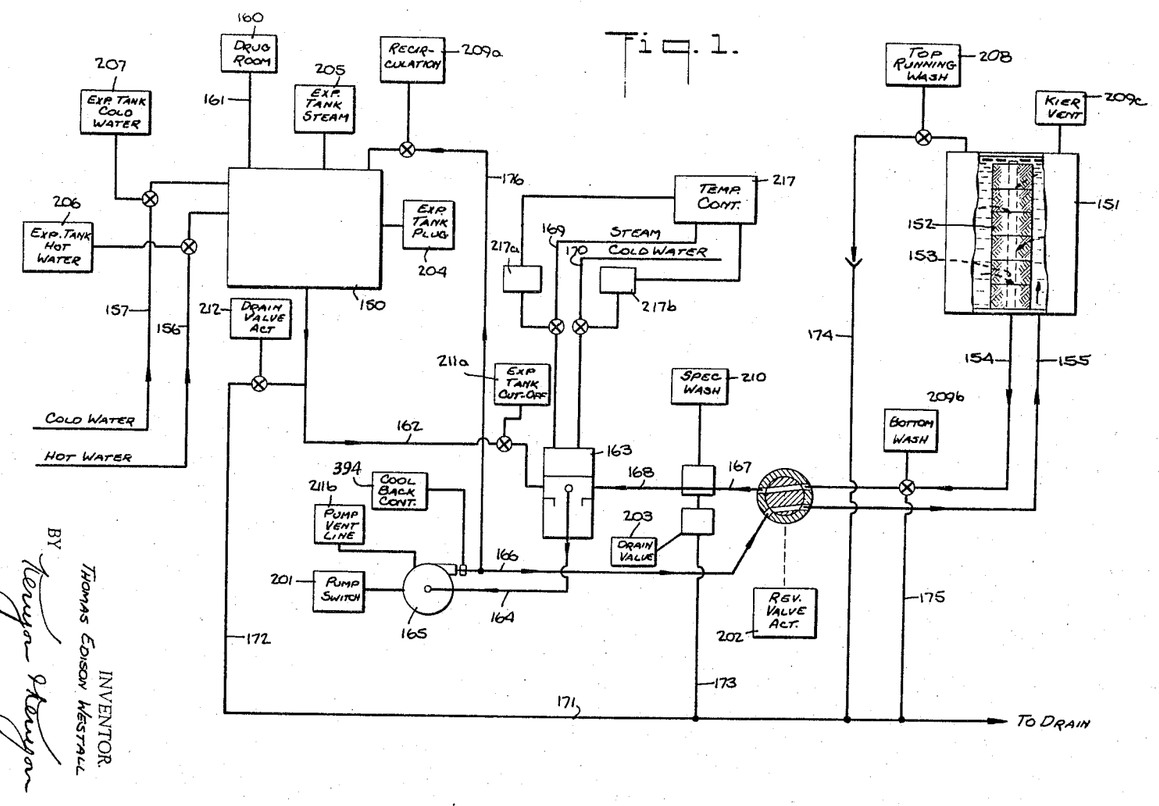
FIG. 1 is a schematic representation of the dye machine showing the various devices which are actuated by the master controller.

The arrangement of the dye machine in accordance with the invention is shown in FIG. 1. The various elements which go to make up the dye machine include expansion tank 150 which serves as the means for introducing the treating material of a dye process into the dye machine. The expansion tank can be alternately connected to kier 151 in which packages of yarn 152 are disposed. The packages are formed by winding the yarn on a hollow core which may be in the form of a perforated tube or of a spiral wound spring. Within the kier the cores of the packages are stacked on tubes 153. Tubes 153 are perforated along their length and closed at the upper end thereof. The lower end of each of the tubes is connected to pipe 154. Pipe 155 is connected to the interior of the kier. With this arrangement fluid flow can be directed through pipe 154 and the perforations of tube 153 to the packages of yarn and ultimately to the interior of the kier. The fluid flow path continues through pipe 155, out of the kier. The direction of flow of fluid with respect to the packages can be reversed by reversing the flow in pipes 154 and 155. Thus the packages of yarn can be subjected to "inside-out" and "outside-in" flow which aids in obtaining uniform dyeing throughout the entire thickness of the winding of yarn on a core.

The dye machine includes a plurality of pipes, valves, and other fluid devices for direction the flow therethrough. Pipe 156 and hot water valve 206 connect the expansion tank to a source of hot water. A source of cold water is connected to the expansion tank by means of pipe 157 and cold water valve 207. Throughout the dye machine the various valves are of the power valve type which can be operated remotely upon a control signal. As an example, pneumatically operated valves can be employed and solenoid control valves in response to a control signal can deliver compressed air to the power valves.

Drug room 160 includes the means for delivering the treating materials or dye process chemicals to the expansion tank. Within the drug room batches of each of the types of chemicals which are to be used in a given dye process are held in a prepared state for introduction upon demand into the expansion tank. The transfer of the batches of chemicals from the drug room to the expansion tank is effected by means of pipe 161.

Figure 2A:
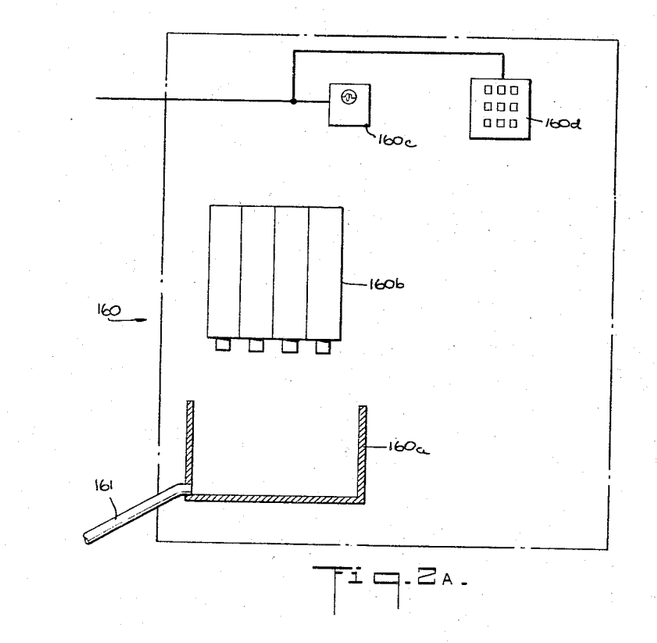
FIG. 2A is a schematic representation of the drug room used in conjunction with the dye machine.

In the drug room the various batches of chemicals can be introduced into pipe 161 by a human operator upon a demand signal or by means of dispensing apparatus responsive to a demand signal. Thus as shown in FIG. 2A drug room 160 includes hopper 160a into which a human operator can insert the required chemicals in order that they may subsequently flow to the expansion tank by way of pipe 161. The drug room can also contain dispensing apparatus 160b which is adapted to deliver one or more preselected chemicals from the plurality stored therein.

In order to effectively dissolve and agitate the chemicals within the expansion tank which are to be introduced into the dye machine, steam can be applied to the interior of the expansion tank from a source by means of steam valve 205. Flow from the expansion tank passes through pipe 162 and expansion tank cut-off valve 211a to heat exchanger 163. One branch of the heat exchanger is connected to pipe 164 to pump 165. The pump is controlled by pump switch 201 and is provided with vent line valve 211b. The discharge side of pump 165 is connected by means of pipe 166 to reversing valve 202. By means of dual internal passage, the reversing valve can direct flow from pipe 166 into either pipes 154 or 155 in order to establish either inside-out or outside-in flow, respectively. Pipe 167 which is the remaining connection to reversing valve 202 is connected to special wash valve 210 which can direct flow from pipe 167 to pipe 168 and the heat exchanger alone (FIG. 2B), toward pipe 168 and drain valve 203 (FIG. 2D), or from pipe 167 toward drain valve 203 alone (FIG. 2C). Flow from pipe 168 passes through heat exchanger 163 and returns to the inlet side of pump 165 by way of pipe 164.

The temperature controlling media for heat exchanger 163 includes steam delivered by pipe 169 and valve 217a as well as cold water connected by means of pipe 170 and valve 217b. Temperature controller 217 which is responsive to the sensed temperature of the fluid discharged from the heat exchanger is programmed to a predetermined temperature set point. Thus any error condition between the sensed temperature and the set point results in the actuation of control valves 217a and 217b in order to maintain a predetermined temperature condition of the discharge fluid.

Various elements of the dye machine can be drained by means of drain line 171. Expansion tank 150 is connected by drain valve 212 and pipe 172 to the drain line. Drain valve 203 receives flow from special wash valve 210 and delivers it by way of pipe 173 to the drain line. Top running wash valve connects kier 151 by means of pipe 174 to the drain line. In addition drain valve 209b connects pipe 154 to the drain line by means of pipe 175.

Whenever dyeing is to be done at a temperature greater than the boiling point it becomes necessary to close the system off from the open expansion tank 150. This is done by closing recirculation valve 209a and cut-off valve 211a. When draining the entire system, drain valve 212 is kept closed and recirculation valve 209a is opened. Draining is accomplished by means of valve 210 when placed in the position shown in FIG. 2D whereby pipes 167 and 168 are connected by means of valve 203 to pipe 173 and the drain line.

In order to wash the yarn with a continuous running wash with the liquid flowing through the yarn from the outside-in, valve 210 is placed in the position shown in FIG. 2C which blocks flow from pipe 167 to pipe 168 and delivers the flow through valve 203 and pipe 173 to the drain line.

Figure 2B:
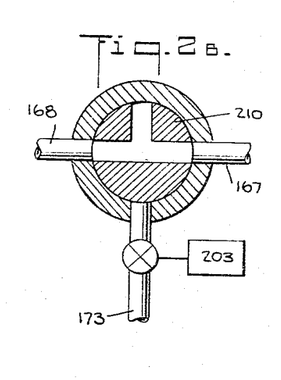
FIG. 2B is a schematic representation of the special wash valve in the recirculating position.
Figures 2C, 2D:
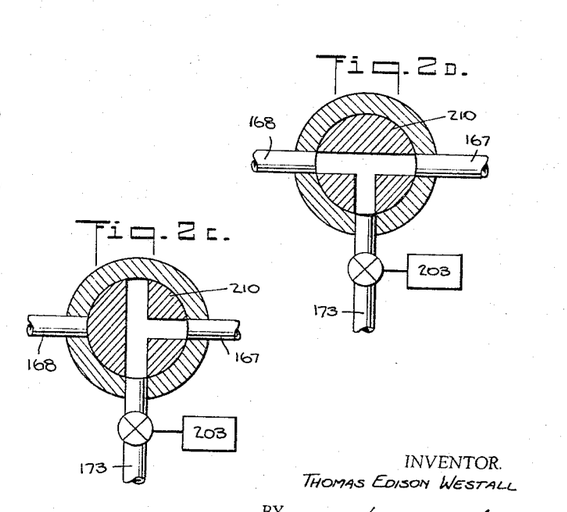
FIG. 2C is a schematic representation of the special wash valve in a draining position.
FIG. 2D is a schematic representation of the special wash valve in an alternate draining position.

When recirculating the flow from the kier back to pump 165, valve 210 is placed in the position shown in FIG. 2B wherein flow is passed from pipe 167 to pipe 168 and thence through the heat exchanger to the inlet side of the pump.

In order to wash the yarn from the inside-out, reversing valve 202 is positioned to direct flow to pipe 154 and valve 208 is opened to permit flow through pipe 174 to the drain line.

Whenever pump 165 is in operation and valve 211a is open, recirculation valve 209a can be adjusted to bypass a portion of the flow from the pump discharge through pipe 176 and back to the expansion tank. This portion of flow can then return by way of pipe 162, the expansion tank cut-off valve, heat exchanger 163, and pipe 164 to the pump inlet.

Figure 4:
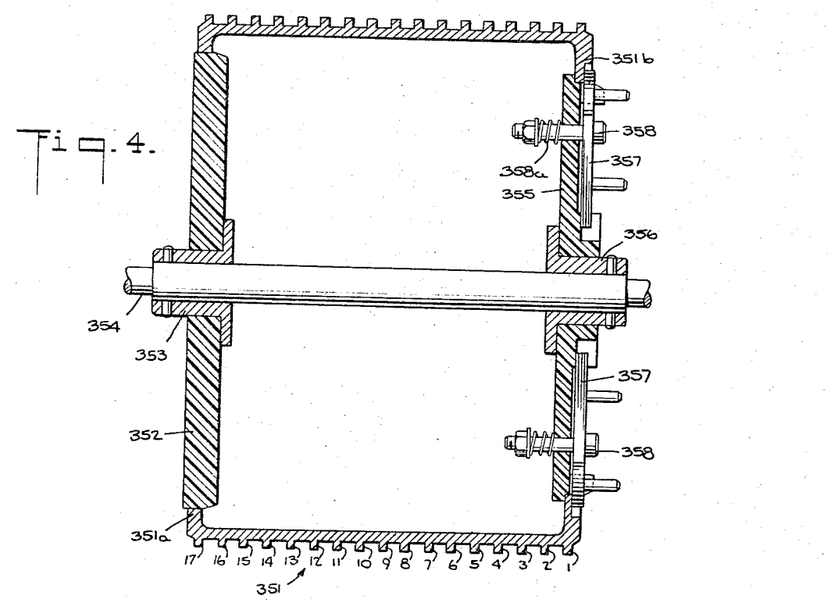
FIG. 4 is a vertical section view of the cam drum showing it mounted with respect to the master controller shaft.
Figure 5:
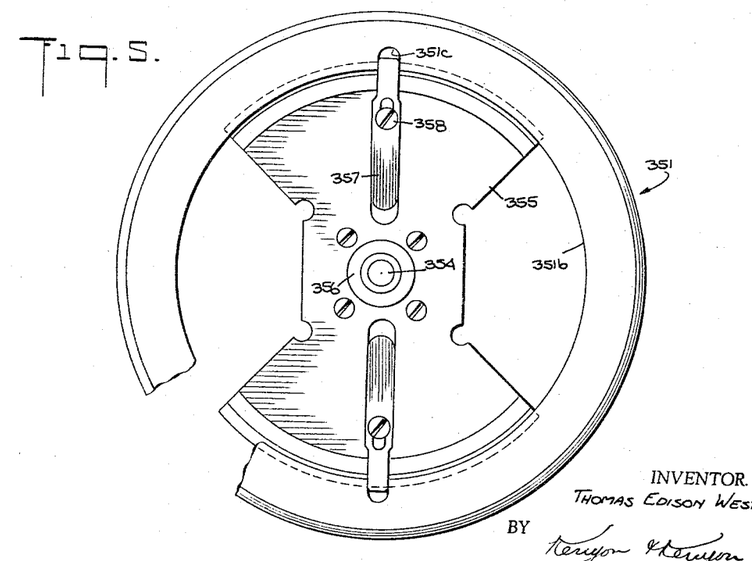
FIG. 5 is a side elevational view of the cam drum showing the means for securing it to the end supports of the master controller shaft.

Master controller 350 employs drum 351 which contains cams 1–17 which are spaced apart parallel to one another about the circumference of the drum (FIGS. 3 and 4). At one end of the drum, rim 351a is mounted upon support 352. The support in turn is mounted upon bushing 353 which is attached to shaft 354. At the opposite end of the drum, rim 351b is engaged with support 355 which extends from bushing 356 attached to shaft 354. The drum is secured in place with respect to the supports by means of keys 357 which can move radially outwardly to engage slots 351c of the drum (FIG. 5). The keys are retained in their operative position by means of the clamping action of bolts 358 having springs 358a.

As shown in FIG. 3 the drum and shaft are supported in the controller by end plates 359a and b. Between the end plates there are disposed rods 360 and rods 361. Switches 301, 303, 305, etc. are supported by rods 360 with their operating levers in engagement with cams 1, 3, 5, etc., respectively. Similarly switches 302, 304, 306, etc. are mounted upon rods 361 in a position in which their levers engage cams 2, 4, 6, etc., respectively.

Figure 6:
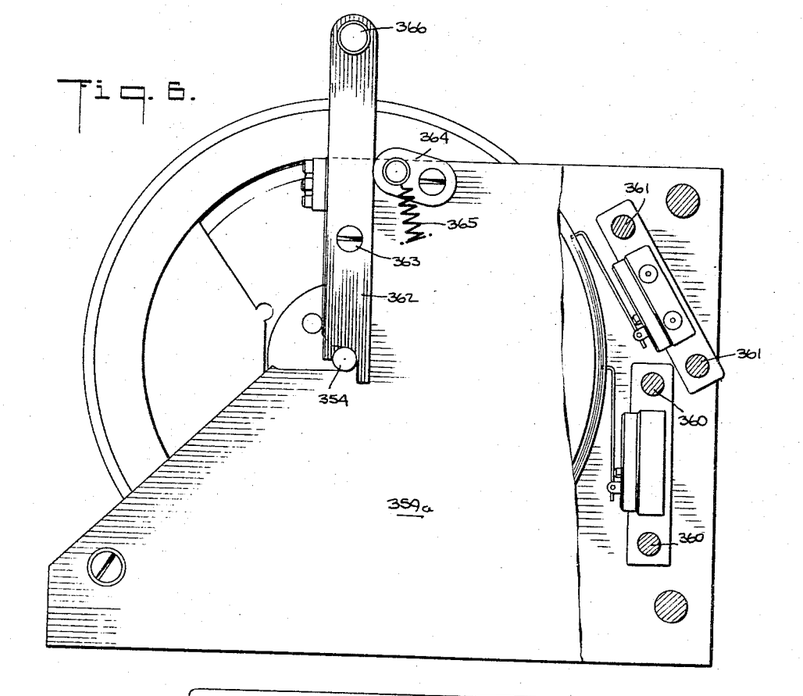
FIG. 6 is a side elevational view of the master controller showing a pair of the cam operated switches.

Guides 362 which are pivotally supported with respect to the end plates by screws 363 retain the journals of shaft 354 in their operating position with respect to the end plates (FIG. 6). Pivotally mounted links 364 biased by springs 365 urge the guides in a manner to retain shaft 354 in its proper operating position in the end plates. By means of handle 366 the guides can be forced against the links in order to disengage the guides from the shaft whenever the cam and shaft are to be removed from the controller in order to change from one dyeing process to another (FIG. 3). Collars 367 position the shaft and drum axially with respect to the end plates.

The means for driving the plurality of cams is clock motor 368 which drives pinion 368a in engagement with gear 369a mounted upon shaft 369. Pinion 369b on shaft 306 drives gear 370a mounted upon shaft 370. The motion of shaft 370 is transmitted by overrunning clutch 371 to shaft 372 upon which is mounted pinion 372a. The drive to shaft 354 is completed by the engagement of pinion 372a with gear 354a mounted upon the shaft. In this manner the cam drum can be conditioned to move through a portion or an entire revolution in a predetermined period of time such as for an example a period of eight hours.

Figure 7:
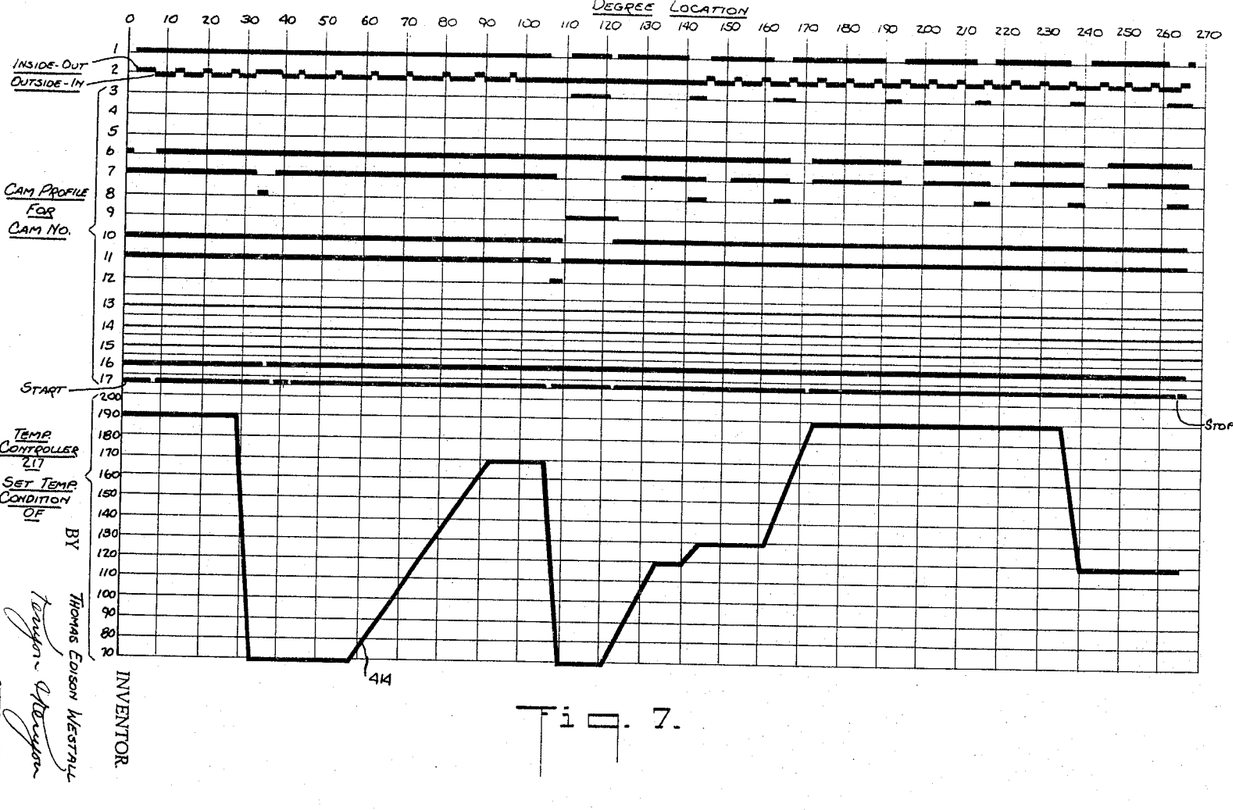
FIG. 7 is a graphical chart of the profiles of the cams of the cam drum and the cam of the temperature controller plotted with respect to the circumferential degree positions of each.

The upper portion of FIG. 7 shows the profile of the plurality of seventeen cams plotted against the circumferential cam position in degrees of arc. The heavily ruled lines corresponding to the various cams indicate the arcuate portion or portions of a cam which actuates the switch associated with it in one sense or the other. With respect to the presentation of cam 2, the heavily ruled portions are shown at two different levels merely to indicate the direction of flow with respect to the yarn, that is to say the heavily ruled lines in the upper position correspond to an inside-out flow condition while the heavily ruled lines in the lower position correspond to an outside-in flow condition.

The cam chart in the upper portion of FIG. 7 is an example of the cycle of operation required in dyeing a particular shade. It can be noted that the chart extends to only 270 degrees but it should be understood that the entire circumference of each of the cams is available as a control element. In practice, a plurality of cams corresponding to the desired processes would be stored adjacent to the controller so that a quick change in operation can be made.

The circuitry related to the switches operated by cams 1–13, 16 and 17, is shown in FIGS. 8A–H, J–N, P and Q, respectively. The plurality of selector and control switches 101–137 of the various portions of FIG. 8 are identified by title in the view of the control panel of the apparatus shown in FIG. 9. In the various portions of FIG. 8 a diagonal line symbol is used to indicate the normally closed contact of the cam switch contacts related to each of the cams. In addition in the various portions of FIG. 8, the symbol for a single contact of certain of the switches 101–137 represents a single pole switch while the symbol showing a pair of contacts immediately adjacent one another of certain of the switches 101–137 represents a double pole switch. In both the various portions of FIG. 8 and in FIG. 9, the legends y and g indicate yellow and green lamps, respectively which mark the present occurrence of one of the functions shown in FIG. 9.

Figures 8A, 8C:
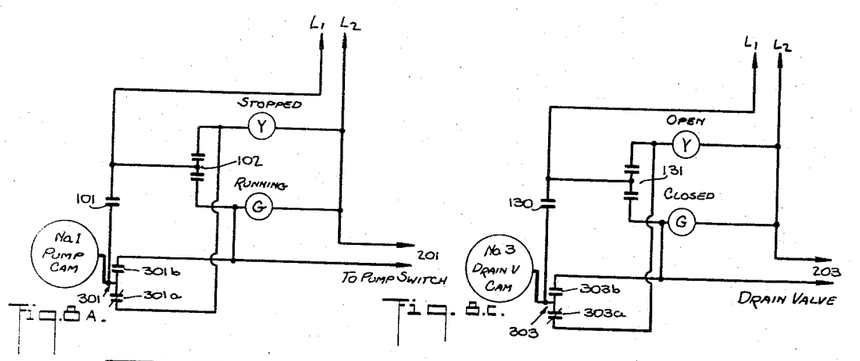
FIG. 8A is a schematic representation of the circuitry controlled by cam 1.
FIG. 8C is a schematic representation of the circuitry controlled by cam 3.

The cam diagram of FIG. 7 indicates the points in the cycle of operation at which the various cams operate their related switches from one state to another. As shown in FIG. 8A when switch 101 is closed for automatic operation and cam 1 closes contacts 301b, pump switch 201 is energized from source L1, L2. The closing of contacts 301b also illuminates the running indicator lamp. With switch 101 open, switch 102 provides for manual control of the pump.

Figure 8B:
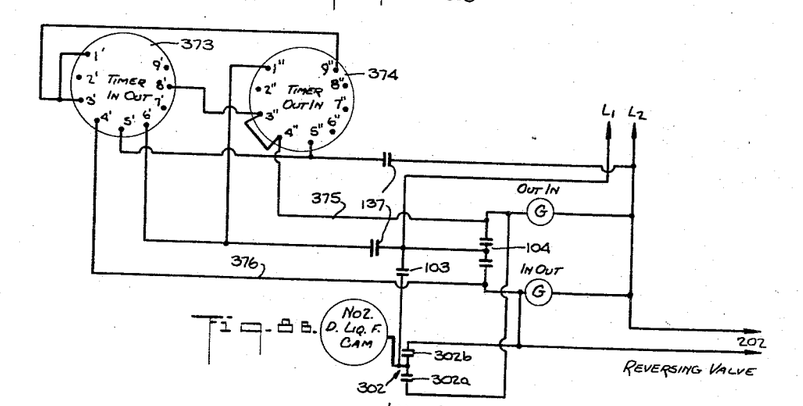
FIG. 8B is a schematic representation of the circuitry controlled by cam 2.

As shown in FIG. 8B switch 103 is closed for automatic operation. The actuation of switch 302 by cam 2 closes contacts 302b which connect line L1 to valve 202, thereby establishing an in-out flow condition in the kier. In the alternate position of switch 302, as controlled by the profile of the cam shown in FIG. 7, contacts 302a are closed and contacts 302b are opened, thereby terminating the connection of line L1 to reversing valve 202. The result is that the valve assumes its alternate position which corresponds to out-in flow in the kier.

Figure 9:
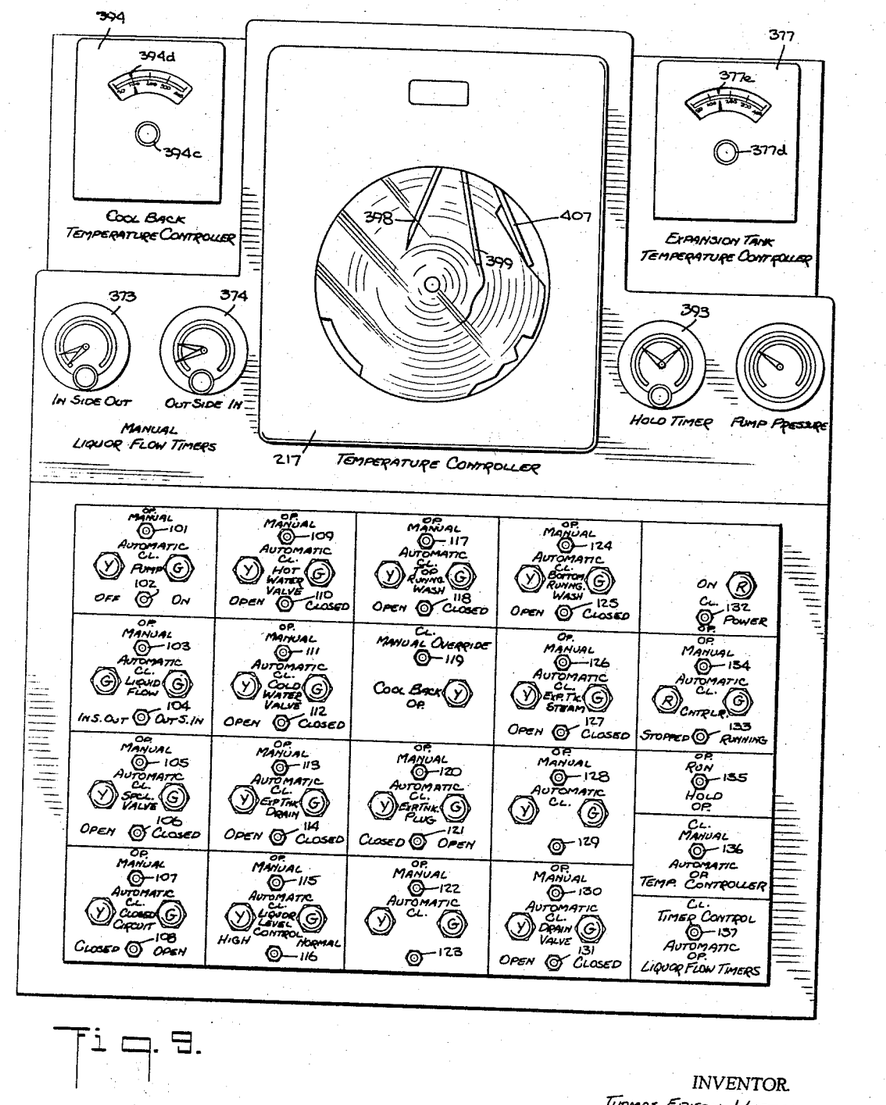
FIG. 9 is a front elevational view of the control panel for the system of the invention.

The duration of flow in a particular direction within the kier can be conrtolled manually by opening switch 103 and closing the contacts of switch 137 which connects lines L1 and L2 to in-out timer 373 and out-in timer 374. Timers 373 and 374 as shown in FIG. 9 can be manually set for a predetermined period of time for manual operation. Thus during the operation of timer 374, a circuit from line L1 is completed through line 375 which, while illuminating the green lamp, leaves reversing valve 202 deenergized and therefore in the out-in state. Activation of timer 373 completes a circuit from line L1 by means of line 376 which results in the energization of the green in-out lamp and the reversing valve 202 thereby establishing the in-out flow condition. Direct manual control can be obtained by the operation of double throw switch 104.

With switch 130 closed for automatic operation the actuation of switch 303 by cam 3 results in the closing of contacts 303b which in turn energize drain valve 203 to open (FIG. 8C) As shown by the cam diagram contacts 303a are normally closed and the drain valve thereby remains closed.

Figures 8D, 8E:
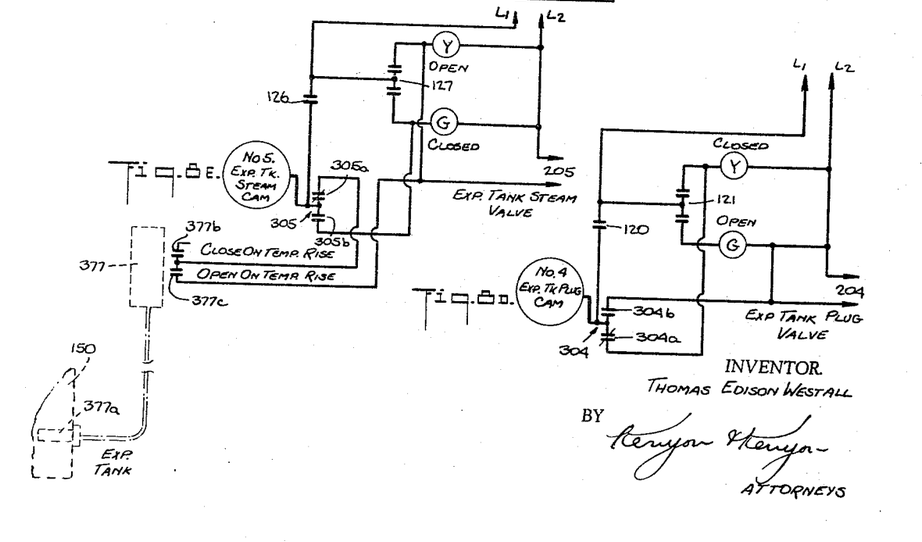
FIG. 8D is a schematic representation of the circuitry controlled by cam 4.
FIG. 8E is a schematic representation of the circuitry controlled by cam 5.

The closing of switch 120 as shown in FIG. 8D sets the circuit for automatic control. Actuation of switch 304 by cam 4 closes contacts 304b and energizes the expansion tank plug valve 204 which is normally closed.

The temperature of expansion tank 150 can be controlled by means of controller 377 which is responsive to the temperature of the contents of the expansion tank by means of sensing bulb 377a disposed therein (FIG. 8E). The operating point of contacts 377b which close on a temperature rise and contacts 377c which open on a temperature rise is set by means of knob 377d of the controller and the set point is indicated by marker 377e. By closing the switch 126 the automatic control of the expansion tank temperature in response to the master controller is introduced. With the cam shown in the cam chart of FIG. 7, contacts 305a remains closed, so that the circuit from line L1 passes through contacts 377c which are closed whenever the temperature of the expansion tank is below the desired temperature. In this way steam valve 205 is energized to admit steam to the expansion tank to heat the contents and to agitate the materials therein. When the desired temperature is reached contacts 377c open and terminate the actuation of the steam valve. Manual control of the steam valve is provided by double throw switch 127.

The amount of hot and cold water that is added to the expansion tank at different points during the cycle is determined by the height of liquid within the expansion tank which is sensed by float switches (FIG. 8F). Thus the expansion tank is provided with low level float switch 377 and high level float switch 378. Float switches 377 and 378 are provided with contacts 377a and b, and 378a and b, respectively.

The float switch that is to be controlling at any particular point in the cycle of operation is selected by cam 13 (FIG. 8N). Thus with switch 115 closed, normally closed contacts 313a connect line L1 by means of line 379 to the contacts of float switch 378. When switch 313 is actuated by cam 13, contacts 313b are closed, thereby connecting line L1 by means of line 380 to low level float switch 377.

Contacts 306a of switch 306, as shown in FIG. 8F, are normally closed thereby energizing hot water valve 206. The circuit from line L1 passes through either of the float switches as determined by switch 313. As the actual level within the expansion tank approaches the desired level, normally closed contacts 377a or 378a open, thereby deenergizing the hot water valve.

Similarly as in the case of hot water, switch 307 controls the cold water supply. Again the float switches determine the amount of water admitted to the expansion tank when contacts 307a are closed. In both the cold water and hot water supply modes, these contacts are closed. In both the cold water and hot water supply modes, the actuation of switches 307 and 306, respectively, close the respective water valves. Manual control is provided by switches 110 and 112.

Cam 8 as shown in FIG. 8H controls the operation of top running wash valve 208. Cam 9 shown in FIG. 8J by means of switch 309 controls the actuation of recirculation valve 209a, bottom wash valve 209b, and kier vent valve 209c. Cam 10 shown in FIG. 8K actuates switch 310 to control special wash valve 210.

Cam 11 controls the duration of the closed circuit dyeing operation as shown in FIG. 8L. Cam 11 actuates switch 311 and thereby controls expansion tank cut-off valve 211a, recirculation valve 209a and pump vent valve 211b. Expansion tank drain valve 212 is controlled by cam 12 by way of switch 312 (FIG. 8M). Cams 14 and 15 can be used in a manner similar to that shown herein to control additional devices, such as valves, etc., as may be required for specific dyeing cycles.

When contacts 317a of switch 317 are in their normally closed position, line 381 is connected to line L1 and thereby lights the red stop light as well as drug room light 160c (FIG. 8Q). In the automatic mode of operation switch 136 connects line 382 to line L1. When set for automatic operation the contacts of switch 134 as shown in FIG. 8Q will also be closed. At this point is can be assumed that cam 16 is not in the cool back portion of the cycle and therefore as shown by the cam chart, switch 316 would be actuated and contacts 316b closed. In this way contacts 316b connect line 383 to line 384. This function can also be achieved by the closure of override switch 119.

When contacts 317a are closed and the drug room light energized, the drug room operator inserts the required chemicals and the like into hopper 160a and then the operator actuates switch 385. By means of lines 386 and 387, switch 385 completes the circuit from line 381 to line 388. In this way the winding of relay 390 is energized by means of the circuit terminating at line L2. Contacts 390a and b are then closed. Contacts 390a maintain the coil of the relay energized so that it is self-holding. Contacts 390b complete the circuit of line L1 to switch 134 and onto line 382. With switch 135 in the closed position corresponding to a running condition, the circuit from line L1 continues through line 391 and switch 134 to master controller motor 368.

At the same time temperature controller 217 is energized. In response to movement of the controller motor, cam 17 actuates switch 317 thereby closing contacts 317b which connect line L1 to lines 383 and 384. In this way the energization of the controller motor and the temperature controller can be maintained. At the same time the opening of contacts 317a deenergizes the winding of relay 390 with the result that contacts 390a and 390b reopen. At the same time the "stopped" light at the panel and the drug room light are extinguished. Operation would then continue under the influence of the closed contacts 317b until the next actuation by cam 17 which would open contacts 317b and restore the contacts 317a to their normally closed position.

The drug room can be provided with digital number annunciator 160d to indicate to the drug room operator the particular step or portion of the cycle that is presently occurring (FIG. 2A). Thus with each actuation of light 160c the annunciator would be advanced one digit.

For manual operation switch 136 may be set to connect line L1 to line 392 thereby energizing the temperature controller to maintain it in operation (FIG. 8Q). Under this condition contacts 134 are open so that the controller motor is not energized. During a cool-back cycle it is necessary to reduce the temperature of the liquid within the kier at a predetermined rate. When under manual control the operator sets timer 393 and then monitors the temperature by adjusting the controller over the period of time set within the timer.

During automatic operation, at the time in the cycle for initiating the cool-back portion, cam 16 opens contacts 316b which interrupts the circuit from contacts 317b of the switch for the controller motor and causes master controller to stop. The cool-back cycle then continues until the required reduced temperature level is sensed by cool-back temperature controller 394 which has bulb 394a inserted in the pump discharge adjacent pipe 166 (FIG. 8P). Contacts 394b of the cool-back temperature controller close at the set temperature, connect lines 383 and 384, and again complete the circuit originating at contacts 317b to the controller motor. The controller motor then begins again to rotate the cam drum and the cycle continues. As shown in FIG. 9 the cool-back temperature controller is set by means of knob 394c and setting pointer 394d.

Figure 10:
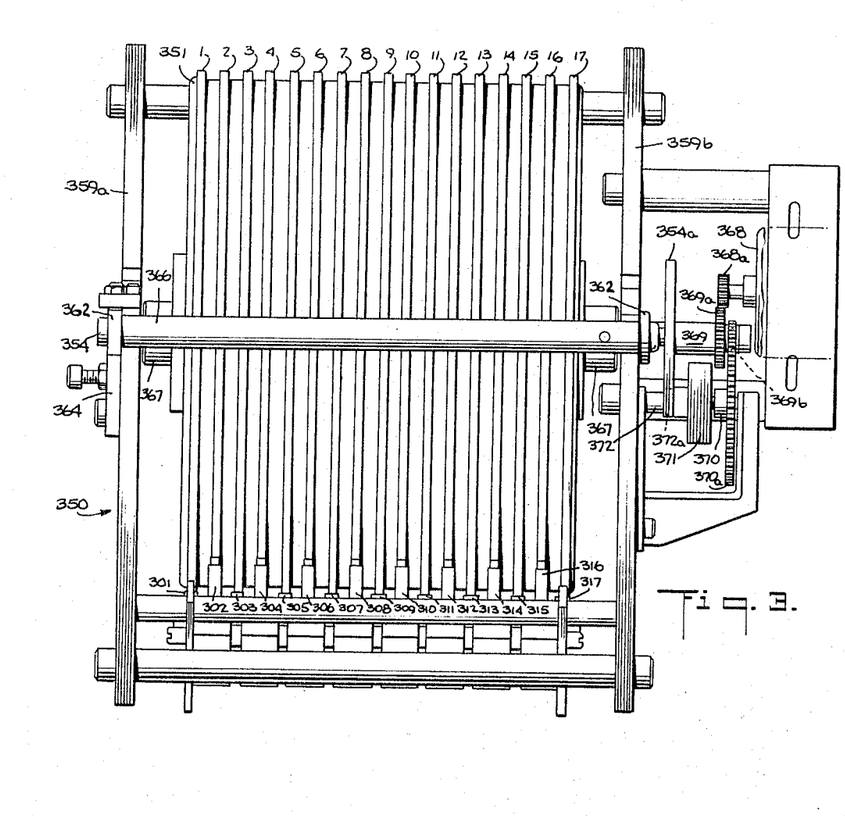
FIG. 10 is a front elevational view showing the programming of the temperature set point of temperature controller in response to its clock driven disk cam.

Temperature controller 217 can include the basic structure of standard temperature controllers such as those operating with electrical or pneumatic circuitry (FIG. 10). An example of one of the standard temperature controllers which can be employed for controller 217 is the Model 40 Temperature Controller of The Foxboro Company of Foxboro, Massachusetts. The temperature of the fluid passing from exchanger 163 is sensed by temperature bulb 395 connected to the controller. In accordance with conventional controller design the controller is provided with a servomechanism which can receive a command or set temperature condition, compare it to the actual temperature sensed at a predetermined location by means of a temperature bulb, produce an error signal as a result of the comparison, and deliver an output signal in response to the error signal in order to change the temperature of the system in a corrective manner. Such controllers commonly present the actual temperature condition by means of a pointer which is adapted to record upon a circular paper chart. Furthermore such controllers contain linkage by which the desired temperature condition is set into the servomechanism of the controller and a pointer to indicate the desired condition by means of the temperature scale on the paper recording chart.

As shown in FIG. 10 controller 217 includes shaft 396 which is the shaft normally employed to set in the desired temperature condition in a standard controller. Rotation of shaft 396 sets the control condition into servomechanism 397 of the controller and the set point is shown upon scale 402 by pointer 398. The actual temperature condition determines the position of pointer 399. The controller includes clock drive 400 which rotates shaft 401 and thereby drives circular recording chart 402.

Figure 11:
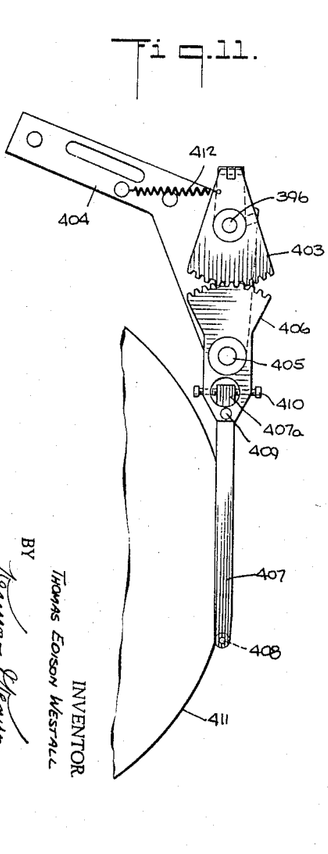
FIG. 11 is an enlarged fragmentary view of the linkage for programming the temperature controller in response to the controller disk cam.

In accordance with the invention the knob or equivalent actuating device for setting shaft 396 is removed and in its place the shaft is provided with sector gear 403 (FIG. 11). The controller is further provided with bracket 404 which supports pivot 405 of sector gear 406. Arm 407 is attached at one end to sector gear 406 and at the other end it is provided with roller follower 408. Further in accordance with the invention, shaft 401 of the controller is provided with disk cam 411 mounted about the axis of the shaft (FIG. 10). In order to calibrate the controller by moving follower 408 with respect to cam 411, arm 407 is pivoted about shaft 409 by screw 410 extending through end portion 407a of the arm.

With roller follower 408 biased against the circumferential cam surface of cam 411 by means of spring 412, it can be seen from FIGS. 10 and 11 that as the cam rotates, arm 407 is moved about pivot 405, thereby causing relative motion of the sector gears and rotation of shaft 396. Thus the motion produced by the cam is converted into rotational motion of shaft 396 which as stated above is the means of setting the control point of servomechanism 397 of the controller. Thus as opposed to the prior art arrangement wherein the human operator manually rotates shaft 396 to set the controller, in accordance with the invention motor driven cam 411 is adapted to rotate shaft 396 and thereby automatically set the controller in a predetermined manner.

In one embodiment of the invention cam 411 is constructed of transparent plastic material and mounted upon shaft 401 in front of and spaced from recording chart 402 so that pointer 399 can apply trace 413 of the actual temperature condition and be visible through the transparent cam.

Since shaft 401 is operated by clock drive 400 the cam rotates at a predetermined rate and therefore can be conveniently profiled to present a set temperature condition against time. This is shown by graph 414 in FIG. 7 wherein the vertical axis corresponds to set temperature conditions and the horizontal axis corresponds to degree positions about the cam. In turn the degree positions correspond to time locations within the cycle.

As shown by the circuitry represented by dash lines in FIG. 8Q, two master controllers can be connected for tandem operation. Switch 420 is inserted in line 381 between junctions 421 and 422. Relay 423 includes contacts 423a and winding 423b. The contacts are normally closed and therefore open when the winding is energized. Contacts 423a are adapted to connect junction 424 to junction 422. Switch 425 connects one end of the winding to junction 426. The other end of the winding is connected to switch 427 which in turn is connected to line 428.

In setting up the controllers for tandem operation it is necessary to provide one controller with the circuitry shown in dash lines in FIG. 8Q to provide the second controller with switch 420 between junctions 421 and 422, and to connect line 428 to junction 426 in the second controller.

OPERATION

Prior to placing the system into operation it is necessary to select a particular cam drum 351 which has been prepared to program the dye machine for applying a specific shade to a specific type of yarn. Guides 362 are then elevated and the cam drum and shaft assembly is installed with respect to end plates 359a and b. With the guides repositioned to their retaining position the drum by virtue of overrunning clutch 371 can be advanced in the direction of its normal rotation until switches 301–317 have their operating levers at the cycle starting location point of the cam drum. While packages 152 of the yarn are placed upon tubes 153 within kier 151, the drug room operator prepares the various batches of chemicals which are required for the particular dye process.

At the same time temperature controller 217 is provided with cam 411 which is adapted to program the set point of the servomechanism within the temperature controller. Cam 411 is selected to provide the desired temperature condition for all portions of the dyeing cycle. Further in accordance with the particular process that is to be applied, expansion tank temperature controller 377 and cool-back temperature controller 394 are adjusted to the required set conditions.

When the system is ready to be placed into operation the cam drum is positioned at the starting point which is the zero degree position shown in FIG. 7. Upon closing power switch 132, line L1 is connected to the circuitry shown in the various portions of FIG. 8. By means of contacts 317a, lamp 160c is illuminated in the drug room and annunciator 160d presents number 1 to indicate the beginning of the cycle. At this point drug room operator closes switch 385 which starts the system into operation. In response to the closing of switch 385, master controller motor 368 is energized and advances the cam drum into the beginning portion of the operating cycle (FIG. 8Q).

As shown by the cam chart during the first portion of the cycle the dye machine is filled with water and is made ready for the first chemical. At the conclusion of this first portion, cam 17 closes contacts 317a and opens contacts 317d thereby lighting the drug room lamp 160c and terminating the movement of master controller motor 368. At the same time annunciator 160d in the drug room displays number 2. The drug room operator then consults his instruction card which contains lists of chemicals and the like to be added which are numbered to correspond to each of the numbered portions of the cycle shown by the annunciator. The operator inserts the chemicals into hopper 160a and then closes switch 385 which again begins the operation of the master controller motor for programming the dye machine equipment.

The controller continues to program the various elements of the system as shown in the controller cam chart of FIG. 7. During the process whenever the temperature controller is energized as shown in FIG. 8Q, the temperature of the fluid discharging from the heat exchanger is maintained in accordance with the program of cam 411. At any point in the cycle, switch 134 can be opened by the operator at the dye machine in order to stop the master controller. Following the stopping of the master controller the operator can apply manual control by means of the switches on the control panel shown in FIG. 9. After a period of manual control, automatic control can be restored by closing switch 134 and activating the master controller motor. When the controller motor is deenergized by opening switch 134, temperature controller 217 may be maintained in operation by means of switch 136. With such a practice it may be necessary, whenever automatic control is to be resumed, to synchronize cam 411 with the master controller.

At the end of the cycle the controller stops in response to cam 17 thereby illuminating indicator 160c in the drug room and displaying the final number of the cycle at annunciator 160d. At any time during the cycle if it is desired to repeat a portion thereof, the control system can be momentarily shut down, the cam drum can be repositioned by virtue of the overrunning clutch, and if necessary, the cam of the temperature controller can be resynchronized to the new position of the cam drum. Thus upon reactivating the control system, one or more portions of the cycle can be repeated as required.

Although the invention is described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A control system for apparatus which is adapted to apply a plurality of predetermined timed dyeing cycles to goods, each of the predetermined timed dyeing cycles being divided into a series of predetermined periods, the apparatus having a kier for receiving the goods to be dyed, a tank for receiving treating liquids to be transferred with respect to the kier, means for introducing dyeing materials into the apparatus, and a plurality of elements for conditioning the flow and the state of treating liquids which are to be applied to the goods in the kier, at least some of the plurality of elements conditioning the flow and the state of the treating liquids during every period of each of the plurality of predetermined time dyeing cycles, said control system comprising a plurality of means for operating each of the plurality of conditioning elements, interchangeable timing means containing data restricted to a selected one of the plurality of predetermined time dyeing cycles for automatically actuating each of the plurality of operating means in accordance with the selected cycle to which said interchangeable timing means is restricted, means for driving said interchangeable timing means through the selected dyeing cycle to which said interchangeable timing means is restricted, means responsive to said interchangeable timing means for interrupting the operation of said driving means at the end of each of the predetermined periods of the selected dyeing cycle, the interrupting of the driving of said interchangeable means providing the time necessary for the means for introducing dyeing materials to function, means for restoring the operation of said driving means following an interruption thereof, and means connected to at least, a portion of the plurality of conditioning elements and driven in synchronism with said interchangeable timing means for controlling the temperature of treating liquids in response to a predetermined timed temperature program which corresponds to at least the selected dyeing cycle to which said interchangeable means is restricted.

2. A control system in accordance with claim 1 and further comprising means responsive to said interchangeable timing means for establishing a predetermined temperature condition in the treating liquids during an interruption of the operation of said driving means, whereby a predetermined temperature condition can be established in the treating liquid between periods of the selected dyeing cycle.

3. A control system in accordance with claim 2 in which said means responsive to said interchangeable timing means for establishing a predetermined temperature condition in the treating liquids includes means for restoring the operation of said driving means when the predetermined temperature condition in the treating liquids is established, whereby the interruption of the selected dyeing cycle is limited to the extent of time necessary to establish the predetermined temperature condition.

4. A control system in accordance with claim 3 in which said means responsive to said interchangeable timing means for establishing a predetermined temperature condition in the treating liquid establishes the predetermined temperature condition in the treating liquids being delivered to the kier, the predetermined temperature being a temperature which is the result of the treating liquids being cooled back from a higher temperature.

5. A control system in accordance with claim 1 and further comprising means for establishing a predetermined level of treating liquids in the tank, whereby the quantity of treating liquids to be introduced into the apparatus can be determined.

6. A control system in accordance with claim 5 in which said means for establishing a predetermined level of treating liquids in the tank comprises a plurality of means each responsive to a different quantity of treating liquids in said tank for controlling the flow of treating liquids into the tank, a selected one of said plurality of flow controlling means being actuated by said interchangeable timing means, whereby one of a plurality of different quantities of treating liquids can be selected for introduction into the tank.

7. A control system in accordance with claim 5 and further comprising a plurality of means for connecting different treating liquids of a plurality of treating liquids to the tank, a selected one of said plurality of connecting means being actuated in response to said interchangeable timing means and the duration of actuation of said selected connecting means being responsive to said level establishing means.

8. A control system in accordance with claim 1 and further comprising means for manually actuating at least a portion of said plurality of operating means and means for manually interrupting and subsequently restoring the operation of said driving means, whereby a manually directed departure from the selected one of the plurality of predetermined timed dyeing cycles can be made.

9. A control system in accordance with claim 8 in which said means for manually actuating at least a portion of said plurality of operating means comprises a plurality of switches associated with the plurality of elements for conditioning the flow and the state of treating liquids which are to be applied to the goods in the kier, each of said plurality of switches being adapted to alternately place a different one of the plurality of elements under the control of said interchangeable means and manual control.

10. A control system in accordance with claim 1 and further comprising means for controlling the flow of treating liquids with respect to the apparatus for predetermined time periods during the interruptions of the selected dyeing cycle which are caused by said interrupting means.

No references cited.

WILLIAM I. PRICE, *Primary Examiner.*

WALTER A. SCHEEL, *Examiner.*